United States Patent [19]
Geisow et al.

[11] Patent Number: 5,671,326
[45] Date of Patent: Sep. 23, 1997

[54] METHOD AND APPARATUS FOR FACILITATING USER GENERATION OF A SET OF MACHINE CONTROL STATEMENTS

[75] Inventors: Adrian Derek Geisow, Portishead; Andrew David Wells, Stoke Gifford; Roy Stephen Marriott, Weston, all of England; Adrian Arnold Buriks, Badalona, Spain

[73] Assignee: Hewlett-Packard Company, Palo Alto, Calif.

[21] Appl. No.: 362,575
[22] PCT Filed: Jul. 9, 1992
[86] PCT No.: PCT/GB92/01253
§ 371 Date: Jan. 9, 1995
§ 102(e) Date: Jan. 9, 1995
[87] PCT Pub. No.: WO94/01817
PCT Pub. Date: Jan. 20, 1994
[51] Int. Cl.⁶ .................................................. G06F 17/00
[52] U.S. Cl. .............................. 395/1; 395/701; 395/702; 395/51; 395/76
[58] Field of Search .......................... 395/51, 702, 919, 395/701, 76, 1, 77, 12

[56] References Cited

U.S. PATENT DOCUMENTS 5,243,689 9/1993 Yoshiura ........................ 395/51

OTHER PUBLICATIONS

"Weighted Decision Tables—An Alternative Solution for Ambiguity", M.L. Schneider, Computer Journal, vol. 28, No. 4, 1985, pp. 366–371.

"A Specification Compiler For Business Application: Space", Proceedings Compsac 87, the 11th Annual International Computer Software & Applications Conference, Oct. 7, 1987, pp. 171–180.

"The Construction of Decision Tables in Prolog", Angewandte Informatik. Applied Informatics, No. 7, 1988, pp. 294–301.

Krutz, "Microprocessors and Logic Design," Wiley & Sons, New York Dec. 30, 1980.

Primary Examiner—David K. Moore
Assistant Examiner—Ji-Yong D. Chung

[57] ABSTRACT

Many machines, particularly computers, execute decision processes during their operation. Such decision processes generally involve ascertaining the values of a number of condition factors and then determining the desired outcome in accordance with a predetermined decision function. This decision function may take the form of a number of individual statements relating condition-factor value combinations to particular outcomes. To facilitate end-user generation and modification of a decision function by generation and modification of a set of component statements, a structured representation for the component statements is presented to the user and statements are created and modified within this structured environment. Before a new or modified set of statements is accepted, it is checked for consistency between statements. Even where a conflict exists between statements, this may be permitted provided it is clear which statement is to have precedence, these being statements that form specific exceptions to more general statements.

15 Claims, 9 Drawing Sheets

|  | CONDITION FACTOR | | | | |
|---|---|---|---|---|---|
| MCS NAME | CF1 | CF2 | · · · · | CFn | Outcome |
| MCS - 1 | | | | | |
| MCS - 2 | | | | 25 | |
| | | | | | |
| MCS - K | | | | | |

FIG 6

| | Customer Type | Customer | Product Line | Product # | Discount |
|---|---|---|---|---|---|
| Reseller 35 | Distributor, OEM | — | — | — | D1 % |
| OEM/Plotters 36 | OEM | — | Plotters | — | D2 % |
| OEM/P1 37 | OEM | — | Plotters | P1 | D6 % |
| XYZ/Special 38 | OEM | XYZ Ltd. | Plotters | P2 | D7 % |
| Other-Plotters 39 | (Distributor, OEM) | — | Plotters | — | D3 % |
| Other-Disks 40 | (Distributor, OEM) | — | Disks | — | D4 % |
| Other-Comptrs 41 | (Distributor, OEM) | — | Computers | — | D5 % |

FIG 7

|  | PRIMARY CF-1 | | | | | | | |
|---|---|---|---|---|---|---|---|---|
|  | Val.1 | Val.2 | Val.3 | Val.4 | Val.5 | — | Val.(i-1) | Val.i |
| PRIMARY CF-2 Val.1 | | | | | | | | |
| Val.2 | | | | | | | | 45 |
| ⋮ | | | | | | | | |
| Val.j | | | | | | | | |

FIG 8

Product Line:

| Customer Type: | Plotters | Disks | Computers |
|---|---|---|---|
| Distributor | D1 % | D1 % | D1 % |
| OEM | *D2 %* | D1 % | D1 % |
| Other | D3 % | D4 % | D5 % |

ON SELECTION

Exceptions: *(OEM Plotters)*

| Product # | Customer | Discount |
|---|---|---|
| P1 | — | D6 % |
| P2 | XYZ Ltd. | D7 % |

FIG 9

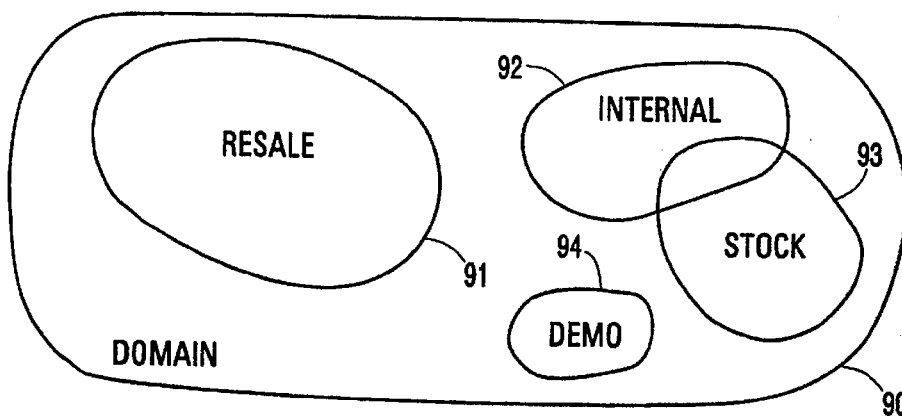
FIG 12A
FIG 12B
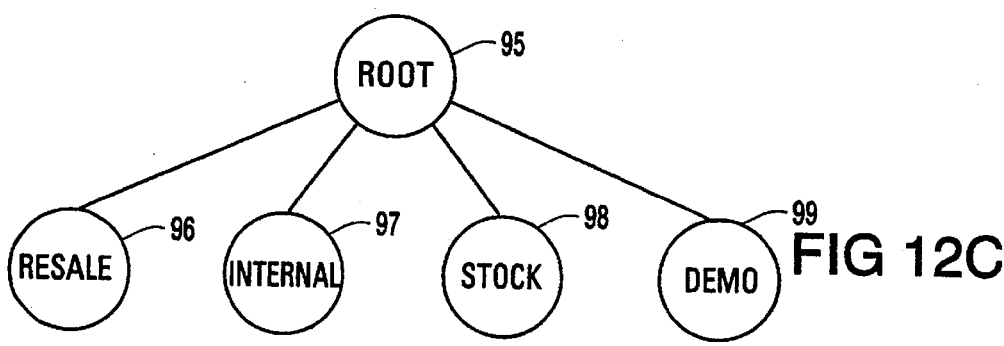
FIG 12C
FIG 12D

|   | ORDER-TYPE | ID-CODE | Discount |
|---|---|---|---|
| 84 — RESALE | T1,TD,L1,S1 | (93) | D10 |
| 85 — INTERNAL | T1,TD,I1 | 93 | D11 |
| 86 — STOCK | I1 | (20) | D12 |
| 87 — DEMO | I1 | 20 | D13 |
| 103 — STOCK-93 | I1 | 93 | D12 |
FIG 13A
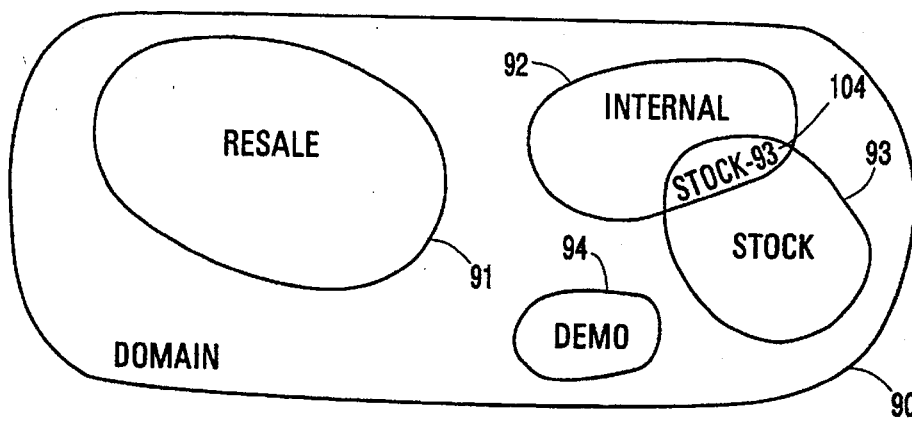
FIG 13B
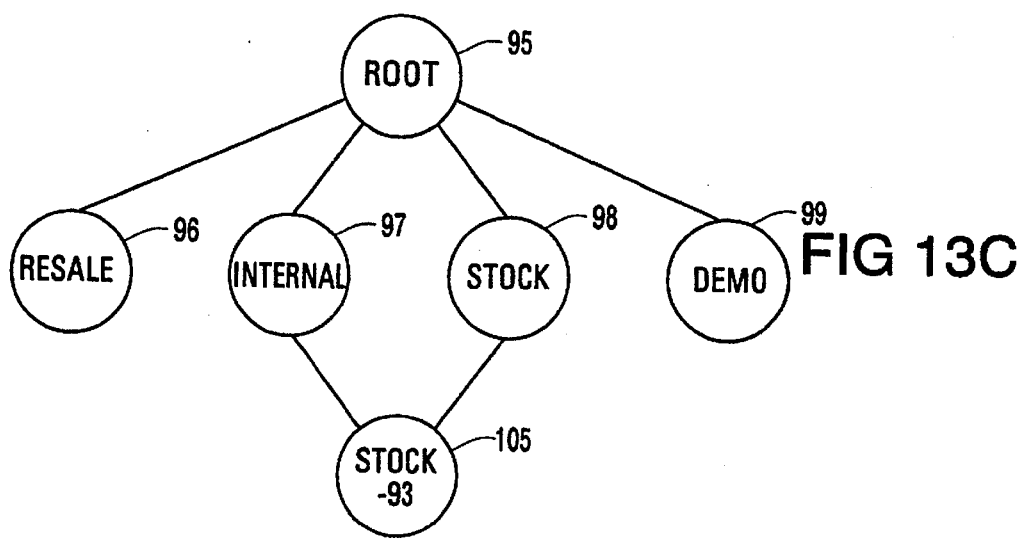
FIG 13C

METHOD AND APPARATUS FOR FACILITATING USER GENERATION OF A SET OF MACHINE CONTROL STATEMENTS

TECHNICAL FIELD

The present invention relates to a method and apparatus for facilitating the user-generation of a set of machine control statements used for controlling the operation of a machine such as a computer.

BACKGROUND ART

Many machines, particularly computers, execute decision processes during their operation. Such decision processes generally involve ascertaining the values of a number of condition factors and then determining the desired outcome in accordance with a predetermined decision function. This decision function may take the form of a number of individual statements relating condition-factor value combinations to particular outcomes. Generally, such statements are either embedded in program code or set out in a knowledge base. In either case, the statements are contained in an environment which is forbidding to all except computer experts. Furthermore, even when a so-called "user-friendly" interface is provided to a knowledge base, anyone wishing to add or modify statements must comply with rigorous rules of syntax and logic in order to produce a consistent set of statements. As this will be well beyond the capabilities of untrained staff, the task of creating and maintaining decision functions based on a set of machine control statements has remained the responsibility of computer staff.

It is an object of the present invention to facilitate the generation and modification of a set of machine control statements that together constitute a decision function.

DISCLOSURE OF THE INVENTION

In general terms, the present invention facilitates end-user generation and modification of a set of machine control statements by presenting these statements in a structured representation and by allowing the user to specify apparently contradictory statements provided that it is clear which statement is to have precedence according to the intuitive principle that a more specific statement has precedence over a more general one.

More formally stated, according to one aspect of the present invention, there is provided a method of facilitating user generation of a set of machine control statements that taken together constitute a decision function relating particular value combinations of a predetermined set of condition factors to corresponding particular outcomes of a set of such outcomes, each individual machine control statement associating a set of one or more condition-factor value combinations, herein CFVCs, with an outcome; the method comprising the steps of:

displaying to a user a structured representation for the machine control statements in which a statement is represented in terms of a visual association between its CFVC set and corresponding outcome;

receiving user input for creating at least one new machine control statement and/or modifying at least one existing machine control statement thereby to generate a new set of machine control statements, the new and/or modified statements being represented in the structured representation; and carrying out a consistency check on the new set of machine control statements by:

(a) identifying any conflicts between statements by identifying any group of at least one CFVC which is common to a plurality of statements that do not all specify the same outcome, (b) determining whether any such conflict is resolvable on the basis of a more specific statement having precedence over a more general one, by determining whether the corresponding group is equal to the set of all the CFVCs encompassed by a statement of the aforesaid plurality, the presence of any such latter statement, herein an exception statement, determining the said conflict to be resolvable with the exception statement being associated with any other statement of the aforesaid plurality such that the exception statement has precedence over said any other statement, and (c) inhibiting acceptance of the new set of statements where an unresolvable conflict is present.

In one embodiment of the invention, the structured representation is a table arranged in rows and columns with the intersection of each row and column defining a cell, each machine control statement being represented in the table by a row/column and each condition factor being associated with a respective column/row and said outcome with at least one column/row whereby the condition factor and outcome values associated with any particular statement are specified in the corresponding cells of the row/column representing that statement.

In another embodiment of the invention, the structured representation is such as to constrain the CFVC set of a new/modified statement to being within a subset of the set of all possible CFVCs whereby to limit the potential for conflict of the new/modified statement to existing statements with a CFVC set within said subset. According to a preferred implementation of this embodiment, the aforesaid predetermined set of condition factors comprises at least two primary condition factors and the structured representation comprises at least one table representing a respective subset of all possible CFVCs of the primary condition factors, this subset being free of overlap with a subset represented by any other table. Each table has rows and columns that serve to associate values of a pairing of primary condition factors, the rows representing respective particular values of a first primary condition factor of the pairing and the columns representing respective particular values of a second primary condition factor of the pairing, whilst the intersection of each row and column defines a cell. Each machine control statement which has its CFVC set encompassed by the subset represented by a table and which is not an exception statement, is then represented in the corresponding table by a respective cell with the values of the first and second primary condition factors for that statement corresponding to the combination of condition factor values associated with the defining row and column of the cell and the outcome of that statement being specified in the cell itself. Where the structured representation comprises a plurality of said tables, then each table is preferably individually selectable for display.

Generally, for the embodiment set out in the preceding paragraph, the predetermined set of condition factors will further comprise at least one secondary condition factor used to specify exception statements, the CFVC set of any exception statement including both:

a combination of values of primary condition factors in respect of which a said cell and corresponding non-exception statement exist, and at least one value of at least one secondary condition factor, the exception statement specifying a different outcome to the aforesaid corresponding non-exception statement whereby it constitutes an exception to the latter. The presence of an exception statement is preferably indicated in the table in which the corresponding non-exception statement is represented by a user-discernible indication associated with the table cell representing the non-exception statement, user access to the exception statement being provided in response to user identification of the cell concerned.

Regardless of the form of structured representation used, the aforesaid consistency check will generally be carried out upon user request following user input for creating at least one new/modified statement. Advantageously, upon the consistency check determining that an unresolvable conflict is present, a visual indication of this conflict and/or the identity of the conflicting statements is displayed to the user.

Where an unresolvable conflict exists, the user is preferably allowed to intervene to remove the conflict by designating a selected statement as having precedence over any other statement with which it conflicts.

When a consistent set of machine control statements has been derived these are preferably converted into a unified flattened tree structure representing the decision function, this tree structure being used in execution of the decision process.

According to another aspect of the present invention, there is provided apparatus of facilitating user generation of a set of machine control statements that taken together constitute a decision function relating particular value combinations of a predetermined set of condition factors to corresponding particular outcomes of a set of such outcomes, each individual machine control statement associating a set of one or more condition-factor value combinations, herein CFVCs, with a said outcome; said apparatus comprising:

means for storing said machine control statements;
   display means for displaying to a user a structured representation of said existing machine control statements in which a said statement is represented in terms of a visual association between its CFVC set and corresponding outcome; input means for receiving user input for creating a new machine control statement and/or for modifying at least one existing machine control statement thereby to generate a new said set of machine control statements, said new and/or modified statements being represented in said structured representation; and
   conflict-checking means for carrying out a consistency check on said new set of machine control statements by:
     (a) identifying any conflicts between statements by identifying any group of at least one CFVC which is common to a plurality of said statements that do not all specify the same outcome,
     (b) determining whether any such conflict is resolvable on the basis of a more specific statement having precedence over a more general one, by determining whether the corresponding said group is equal to the set of all the CFVCs encompassed by a said statement of said plurality, the presence of any such latter statement, herein an exception statement, determining said conflict to be resolvable with said exception statement being associated with any other said statement of said plurality such that the exception statement has precedence over said any other statement, and
     (c) inhibiting acceptance of said new set of statements where an unresolvable conflict is present.

BRIEF DESCRIPTION OF THE DRAWINGS

A method according to the invention and apparatus embodying the invention, both for facilitating the generation of a set of machine control statements, will now be described, by way of non-limiting example, with reference to the accompanying diagrammatic drawings, in which:

FIG. 6 is a diagram illustrating in prototype form, a first table format for representing machine control statements of a decision function;

FIG. 7 is a diagram representing, in the FIG. 6 table format, the constituent machine control statements of an example decision function;

FIG. 8 is a diagram illustrating in prototype form, a second table format for representing machine control statements of a decision function;

FIG. 9 is a diagram representing, in the FIG. 8 table format, the constituent machine control statements of the same example decision function as depicted in FIG. 7;

FIG. 12A illustrates in the FIG. 6 table format, the constituent machine control statements of another example of a decision function;

FIG. 12B is a domain diagram showing the domain regions corresponding to the machine control statements of the decision function shown in FIG. 12A;

FIG. 12C is a containment graph for the FIG. 12A machine control statements;

FIG. 12D is a diagram illustrating displayed help annotations made available to a user during the consistency check procedure of FIG. 11;

FIG. 13A is similar to FIG. 12A but with an additional machine control statement added following the carrying out of the FIG. 11 consistency check;

FIG. 13B is a domain diagram for the machine control statements illustrated in FIG. 13A;

FIG. 13C is a containment graph for the FIG. 13A machine control statements.

BEST MODE FOR CARRYING OUT THE INVENTION

Figure 1:
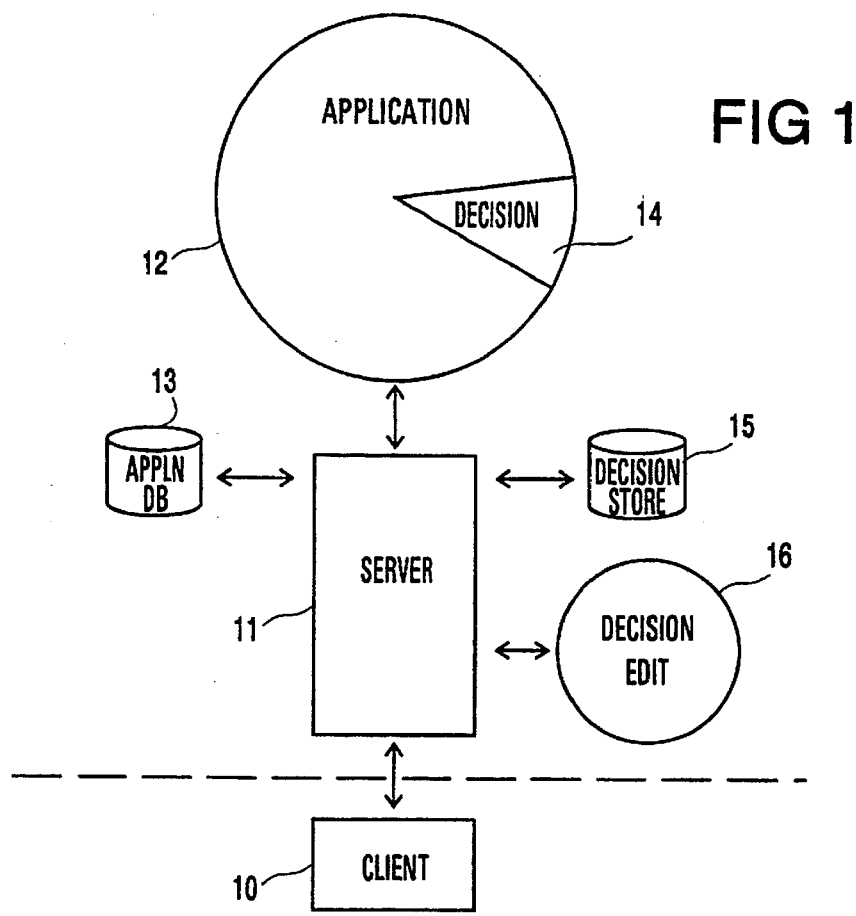
FIG. 1 is a diagram of a client/server computing environment in which the present invention can be implemented.

FIG. 1 of the accompanying drawings is a diagram of a typical computing system for performing the method of the present invention. The system of FIG. 1 is a client/server system in which a client 10 (for example, a PC activated by a user) communicates via an appropriate communications link with a server 11. The server 11 runs an application program 12 either autonomously or under commands entered via by the user activating the client 10. Server 11, in the course of execution of the application program 12, refers to data stored in application database 13. As part of the processing operations of the illustrated application program 12, it is necessary to execute a decision based on the values of a number of decision condition factors. In the present arrangement, server 12 performs decision task 14 by referring to a decision function stored in decision store 15 (for example, in the form of a flattened decision tree).

Separation of the decision function from the body of the application program 12 facilitates creation and editing of the decision function; in the present case, this decision function creation and editing is effected by a decision edit process 16 under command from the client 10. The present invention is concerned with providing a form of decision edit process 16 which facilitates the creation and editing of decision functions by end users operating client 10, rather than by computer professionals. It will, of course, be appreciated that the decision edit process 16 can be run in systems other than the client/server system illustrated in FIG. 1.

Figure 2:
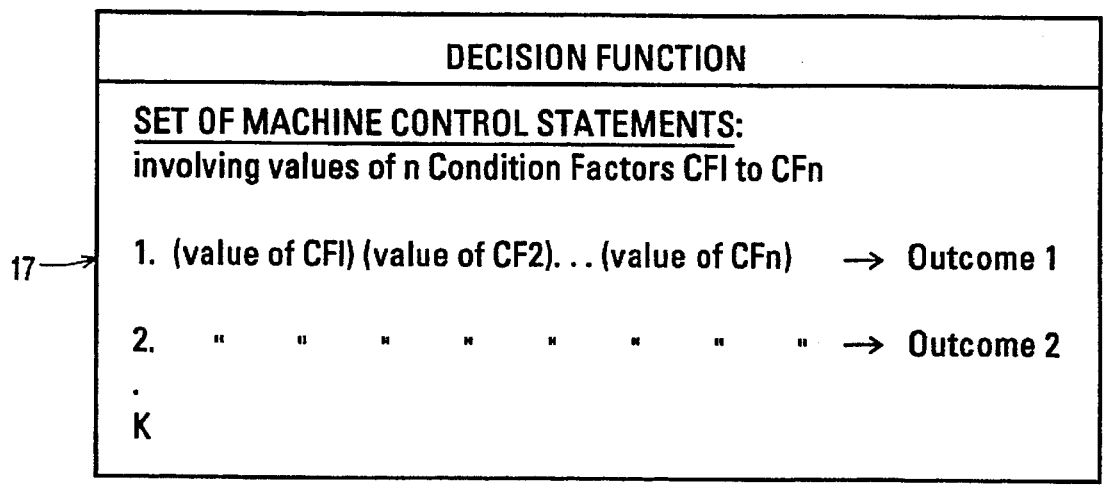
FIG. 2 is a diagram illustrating a set of machine control statements that together constitute a decision function.

The present invention is concerned with decision functions that relate particular value combinations of a predetermined set of condition factors to corresponding particular outcomes of a set of such outcomes. Such a decision function is illustrated in FIG. 2 as a set of machine control statements, each associating a set of one or more combinations of condition-factor values (herein condition-factor value combinations (CFVCs) with a particular outcome. Thus, for a set of n condition factors CF1 to CFn, a first machine control statement 17 associates a first combination of values for the condition factors CF1 to CFn to a first outcome (outcome 1 in FIG. 2), a second statement associates a different combination of condition-factor values with a second outcome, and so on for K machine control statements.

Figure 3:
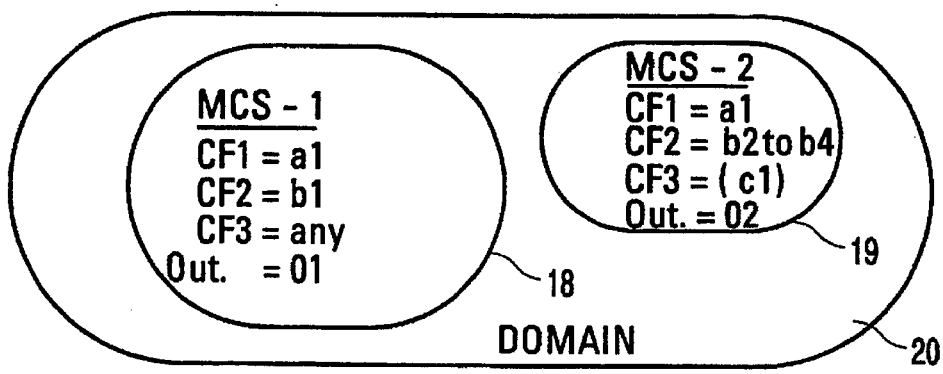
FIG. 3 is a domain diagram for a decision function illustrating the domain regions corresponding to two respective machine control statements of the decision function.
Figure 4:
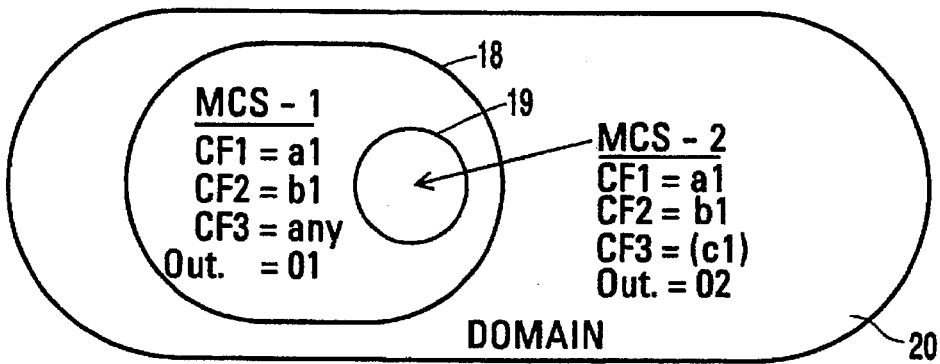
FIG. 4 is a domain diagram similar to FIG. 3 for the case where the domain region corresponding to one of the machine control statements lies fully within the domain region corresponding to the other statement.
Figure 5:
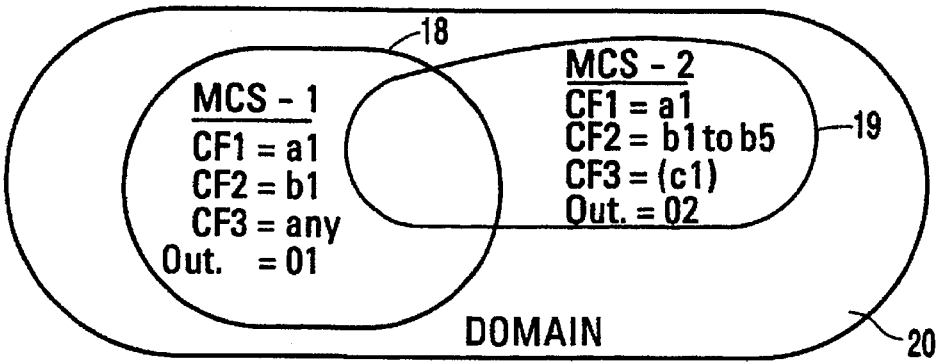
FIG. 5 is a domain diagram similar to FIG. 3 for the case where the domain regions corresponding to the two machine control statements overlap each other.

FIGS. 3 to 5 are graphical forms of the relationship between two machine control statements MCS-1 and MCS-2. In FIGS. 3 to 5, each statement MCS-1, MCS-2 is represented by a respective region 18, 19 within an overall domain 20 which represents all possible combinations of all values for the condition factors associated with a particular decision function. Each of the machine control statements MSC-1 and MCS-2 associates the values of three condition factors CF1, CF2 and CF3 to a corresponding outcome.

In FIG. 3, for machine control statement MCS-1 the first condition factor CF1 has a value of a1, the second condition factor CF2 has a value b1 and the third condition factor has any value of its set of possible values; due to the fact that condition factor CF3 can take on more than one value, the first machine control statement MCS-1 can be viewed as associating a plurality of condition-factor value combinations (CFVCs) with the outcome specified for the statement, this being outcome O1. In the second machine control statement MCS-2 the first condition factor has a value a1, the second condition factor has a range of values b2 to b4, and the third condition factor CF3 has any value other than c1 (this is represented in FIG. 3 by brackets around c1 to indicate all values except c1); again, this machine control statement MCS-2 can be viewed as associating a plurality of CFVCs with a particular outcome, this time outcome O2. The CFVC sets of machine control statements MCS-1 and MCS-2 are such that there is no CFVC which is common to both statements and this is visually apparent from FIG. 3 by the lack of overlap between the regions 18 and 19 representing the two statements.

In FIG. 4 the first machine control statement MCS-1 is identical to the corresponding statement of FIG. 3. However, in FIG. 4 the second machine control statement MCS-2 has had the value associated with the second condition factor CF2 modified to b1. As a result, the set of CFVCs encompassed by the second machine control statements MCS-2 is now fully encompassed by the set of CFVCs of the first machine control statement MCS-1, this being depicted in FIG. 4 by the inclusion of the region 19 within the region 18. As the two machine control statements MCS-1 and MCS-2 specify different outcomes, there is clearly a conflict between the two statements. Assuming that the more restricted statement, that is MSC-2, correctly specifies the desired outcome within its restricted scope, then one possible way of resolving the apparent conflict between the two statements would be to rewrite the first machine control statement MCS-2 to remove from it the CFVC set corresponding to statement MCS-2; in this case, this would require the values encompassed by the condition factor CF3 of statement MCS-1 to be restricted to the value c1. However, a more intuitive way of looking at the apparent conflict between the statements MCS-1 and MCS-2 of FIG. 4 would be to consider MCS-2 to represent an exception with respect to the first statement MCS-1 and then operate the heuristic that an exception statement such as MSC-2 takes precedence over the statement or statements with which it conflicts. This intuitive heuristic is used in the present invention in cases where there is a group of at least one CFVC which is common to a plurality of machine control statements that do not all specify the same outcome and it can be established that this group is equal to the set of all the CFVCs encompassed by one of the statements of the plurality of statements, this one statement then being taken to be an exception statement and being thereafter associated with the other statements such that it takes precedence over them.

In FIG. 5 the first machine control statements MCS-1 is again unaltered from the corresponding statement of FIG. 3. This time, however, the second machine control statement MCS-2 has values b1 to b5 assigned to its second condition factor CF2 with the result that there is now an overlap between the sets of CFVCs encompassed by the two machine control statements, this overlap being depicted in FIG. 5 by overlap of the regions 18 and 19. The exception heuristic described above with reference to FIG. 4 is no longer capable of resolving the conflict between the two machine control statements because neither of the statements can be viewed as providing a limited exception within a larger field covered by the other statement. Corrective action is therefore required and three possibilities exist. Firstly, one or both statements could be modified to avoid overlap. Secondly, one of the statements could be chosen to have precedence over the other. Thirdly, a further statement (or statements) could be defined which specify a region that exactly matches with the overlap region between the first and second machine control statements, this new statement (or statements) then serving as an exception statement for both the first and second machine control statements to which the exception heuristic described above could be applied.

A first table format for representing the machine control statements making up a decision function is illustrated in FIG. 6. In the FIG. 6 table format there are a plurality of columns 23 each of which contains values of a respective one of the condition factors CF1 to CFn involved in the decision function; one or more further columns 23 are used to specify outcome values. A plurality of rows 24 of the table are then used to specify respective machine control statements, these statements being named down the left hand side of the table. Where each row 24 and column 23 intersects, there is a corresponding cell 25 that contains the value of the condition factor or outcome associated with that column 23 relevant to the machine control statement associated with that row 24. The condition factor values and outcome associated with any particular machine control statement can therefore be read off by reading across the corresponding row in the table.

An exemplary decision represented in the FIG. 6 table format is illustrated in FIG. 7. The decision function is concerned with the discount value appropriate to a range of different products (as specified by a "Product Line" condition factor and a "Product Number" condition factor) where these products are sold through a variety of sales channels (specified by a "Customer Type" condition factor and a "Customer" condition factor). Values of the Customer Type, Customer, Product Line, and Product Number condition factors are given in table columns 30, 31, 32 and 33 respectively and applicable discount values are given in table column 34. Seven different machine control statements are presented each in a respective row 35 to 41. The first statement, named "Reseller" is shown in row 35 and specifies a discount of D1% where the Customer Type value is "distributor" or "OEM", this being the case regardless of the value of the Customer, Product Line or Product Number condition factors. The second rule machine control statement named "OEM/Plotters", is presented in row 36 and specifies an exception to the Reseller statement in relation to plotters being sold to OEMs, these condition factor values being specified under Product Line and Customer Type respectively; in this case, which can be seen to fall fully within the scope of the Reseller rule, a discount of D2% is to be applied despite the apparent conflict between the first and second statements. The second statement is permissible because it is an exception to the first statement and can intuitively be seen to be such by a user.

The third statement named "OEM/P1" is presented in row 37 and is itself an exception to the second statement because it specifies that for a particular plotter P1 when sold to OEMs is to have an associated discount of D6%. Again, this statement is accepted on the basis of the exception heuristic. The same is also true of the fourth statement, named "XYZ Special" and presented in row 38, which specifies that for a plotter P2 being sold through the OEM channel to customer XYZ Limited is to receive a discount of D7%; this fourth statement is an exception to the second statement OEM/Plotters.

The fifth, sixth and seventh machine control statements presented in rows 39, 40 and 41 all relate to selling channels other than distributors and OEMs and deal with respective product lines (plotters, disks, and computers respectively). These statements therefore do not conflict either with each other or with the other statements in the FIG. 7 table and are therefore permissible.

A second table format for representing the machine control statements making up a decision function is illustrated in FIG. 8. In fact, except in the case where there are only two condition factors, the FIG. 8 table constitutes only a partial representation of the decision function as will become clear from the following description. For the general case where there are n condition factors at least two of these condition factors are treated as primary condition factors and one or more further condition factors are treated as secondary condition factors. A table of the FIG. 8 form is then used to specify the outcome value for combinations of values for a pairing of primary condition factors; in particular, in FIG. 8, the i values of a primary condition factor CF-1 are represented in respective columns 43 of the table whilst the j values of a second primary condition factor CF-2 are represented in respective rows 44 of the table, the cell 45 lying at the intersection of each row and column being available to specify the outcome corresponding to the combination of condition factor values represented by the relevant row and column. Each occupied cell 45 thus represents a corresponding machine control statement. Where there are other primary condition factors additional to those represented in a particular table, then these other primary condition factors will have particular values for the table concerned. Indeed, there will generally be a plurality of tables of the FIG. 8 format each representing a pairing of primary condition factors and for each of which the primary condition factors not represented in the table have particular values. Each such table can be considered as representing a respective subset of all possible CFVCs of the primary condition factors and the subsets are such that no two subsets overlap with each other. As a result, an outcome entry made in any cell 45 of a table is associated with a unique CFVC set for the primary condition factors and will therefore not conflict with any other outcome specified in a table cell 45.

However, the outcomes specified in the table cells 45 may be qualified by particular combinations of values of one or more secondary condition factors. In this case, the presence of such qualification is indicated in the relevant cell (or in any other suitable manner) to alert the user that exceptions exist relating to the secondary condition factors. These exceptions can be displayed in any suitable manner (for example, the exceptions resulting from a particular combination of secondary condition factors can be displayed in a table of the FIG. 6 format).

FIG. 9 is an illustration in the FIG. 8 table format of the same example decision that is represented in FIG. 7 in respect of the FIG. 6 table format. In the FIG. 9 case, the Product Line condition factor and the Customer Type condition factor are chosen as primary condition factors and are represented in a table 60 of the FIG. 8 format. More particularly, the Product Line condition factor values of plotters, disks and computers are represented in columns 46, 47 and 48 whilst the customer-type condition factor values of Distributor OEM and Other are represented in rows 49, 50 and 51. As can be seen from the table 60, if the Customer Type value is Distributor the applicable discount is D1% regardless of Product Line. If the Customer Type is OEM then the applicable discount is D1% for Product Line values of disks and computers and D2% for plotters and if the Customer Type is Other then the applicable discount is D3% for plotters, D4% for disks and D5% for computers. In fact, the discount applicable for plotters supplied down the OEM channel is not D2% in all situations and the presence of exceptions to the indicated discount is depicted in the corresponding cell 57 of FIG. 60 by showing the discount value D2% in italicized form (other visual indications are, of course, possible such as highlighting, flashing, underlining or the like).

The exceptions to the discount value D2% indicated in table 60 for (Customer Type: OEM) (Product Line: plotters) is shown in table 61 of FIG. 5. Table 61 is a table of the FIG. 6 format in respect of the secondary condition factors, Product Number and the Customer. In table 61 two secondary machine control statements are presented (though not with specific names) in rows 55 and 56, the Product Number and Customer condition factors are represented in columns 52 and 53, and the outcome discounts are presented in column 54. As can be seen, the secondary statement represented by row 54 relates Product Number P1 to a discount value of D6% whilst the secondary statement represented by row 55 relates a Product Number of P2 and customer XYZ Limited to a discount of D7%; both the secondary statements are exceptions to the machine control statement represented by cell 57 of table 60.

It will be appreciated from the examples given in FIGS. 7 and 9 that for both the FIG. 6 table format and the FIG. 8 table format, there is a clear presentation of which machine control statements form exceptions to other statements which may be readily understood by a non-computer professional.

Figure 10A:
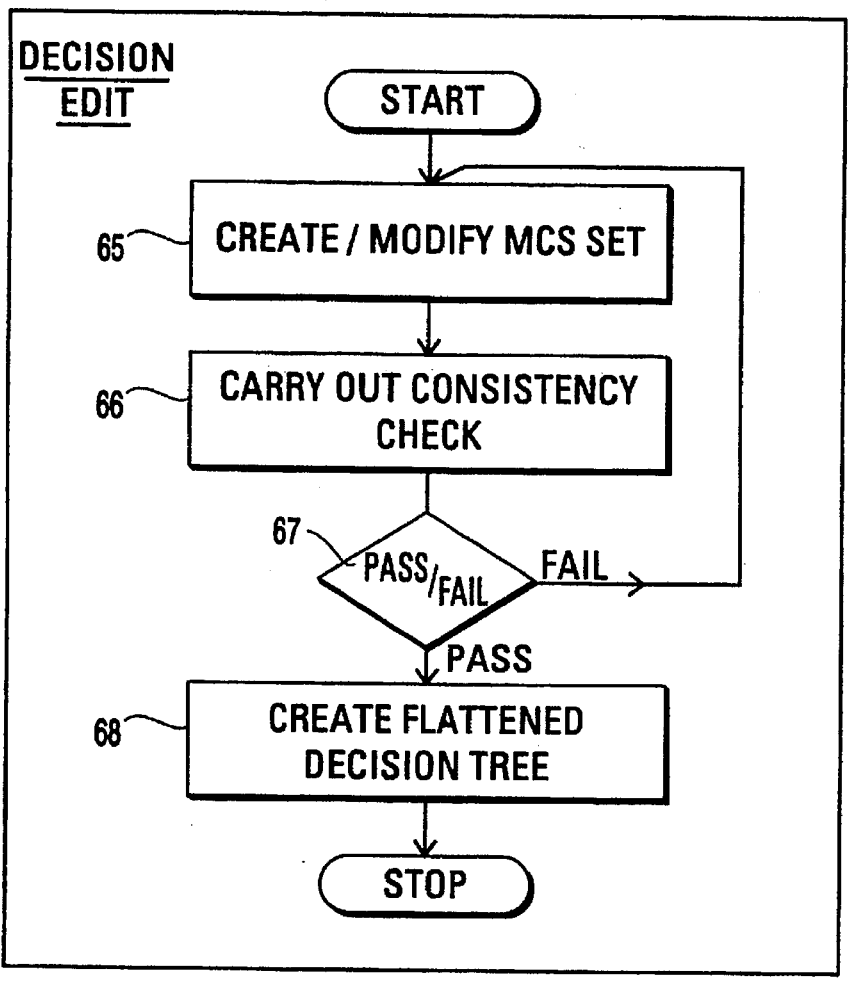
FIG. 10A is a flow chart of a decision edit process for creating/modifying a set of machine control statements that together constitute a decision function.

The decision edit process 16 of FIG. 1 comprises four main steps 65–68 as illustrated in FIG. 10A. In particular, in a first step, the set of machine control statements performing a particular decision function are created and/or modified by a user (step 65). Next, the process 60 carries out a consistency check (step 66) to ensure that the machine control statements are consistent with one another; in carrying out this consistency check the exception heuristic described above is applied to permit the existence of exception statements. If this consistency check is passed (step 67) the decision edit process 16 goes on to create a flattened decision tree (step 68) which it stores in the decision store 15 for use by the application program 23 when executing the decision task 14. Should the consistency check be failed (step 67) then the editing process returns to step 65.

The step 65 of creating/modifying a machine control statement set involves the presentation to the user (for example, on a display unit of the PC client 10) of the machine control statements in a table format either of the FIG. 6 or FIG. 8 form. Where, for example, the machine control statements are presented in a table of the FIG. 6 format, then such a table may be created, expanded or contracted by selecting particular condition factors from a pre-specified list to be added/deleted (thereby increasing/decreasing the number of table columns) and by specifying a new statement name or selecting an existing statement to be deleted (thereby increasing or decreasing the number of table rows). Furthermore, the condition factor values and outcome values may be entered and changed by first selecting the appropriate cell and then entering the desired value (or selecting a desired value from a pre-specified list of values).

User interaction with the displayed table can be in a manner akin to well known spreadsheet techniques and preferably enables user to select and position items using a mouse in a graphical environment. Appropriate techniques for relating values in rows and columns are well known from the spreadsheet art and will therefore not be particularly described herein. Whatever implementation technique is used, at the end of a table creation/editing process, there exists in an internal representation form held in the server, i.e. computer, 11 running the decision edit process 16, a set of associations corresponding to respective machine control statements in which particular values of specified condition factors are related to particular outcomes. At this time, however, it will not be known whether all the statements are consistent with each other or whether one or more statements constitute exceptions to other statements.

Figure 11:
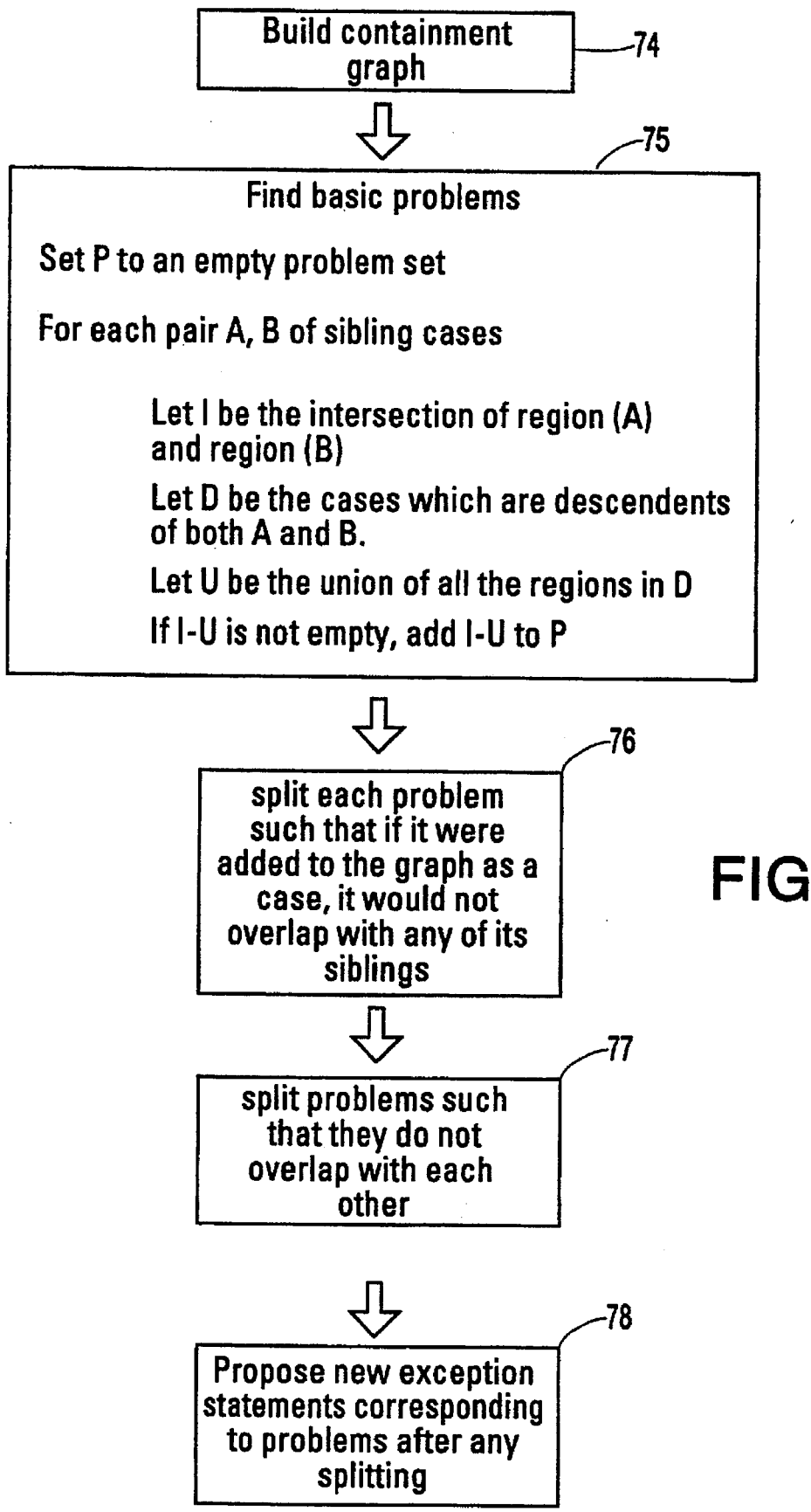
FIG. 11 is a diagram illustrating the main steps involved in a consistency check procedure of the FIG. 10A decision edit process.

Once table creation/editing is finished, the user requests the decision edit process 19 to carry out a consistency check (step 66 of FIG. 10A). The procedure involved in carrying out this consistency check is illustrated in FIG. 11 which will now be described with reference to the example decision functions depicted in FIGS. 12 and 13. More particularly, FIG. 12A represents in the FIG. 6 table format a decision function comprising four machine control statements named Resale, Internal, Stock and Demo set out in respective rows 84,85,86 and 87 of the table 80. These machine control statements are defined in terms of the value of two condition factors Order-type and ID-code associated columns 81 and 82, the outcome of each statement being a discount value set out in column 83. FIG. 12B is a graphical representation of the four machine control statements of FIG. 12A, these statements Resale, Internal, Stock and Demo being represented by respective regions 91,92,93 and 94 within the overall domain 90 of the decision. As can be seen by the overlap between the region 92 associated with the Internal statement and the region 93 associated with the Stock statement, there is a conflict between the Internal and Stock statements.

The first step in the consistency check procedure of FIG. 11 is to build a containment graph (step 74) linking together the internal representations of the machine control statements of the decision function under consideration; a containment graph is one that treats each statement as a node in a graph with a directed edge from a node A associated with a statement A to a node B associated with statement B if and only if the domain region associated with statement B is a subset of the domain region associated with statement A and there is no domain region associated with a further statement C which contains the region of statement B and is contained by the region of statement A.

FIG. 12C is an illustration of the containment graph derived for the four machine control statements of the decision function illustrated in FIGS. 12A and B. In FIG. 12C, the graph starts from a root node 95 corresponding to the overall domain. The graph of 12C further includes respective nodes 96,97,98 and 99 associated with the four machine control statements Resale, Internal, Stock and Demo. By applying the foregoing rule regarding when a directed edge should be included in the graph, the form of graph shown in FIG. 12C is derived in which each of the nodes 96,97,98 and 99 is connected by a respective, directed edge to the root node 95; in other words, none of the nodes 96,97,98 and 99 is dependent from any one of the other nodes 96–99.

The process of constructing the containment graph is simply of one taking each machine control statement in turn and examining its CFVC set in relation to every other machine control statement to determine if the first statement is a proper subset of any second statement and, if so, if there is any third statement for which the first statement is also a subset. If this process reveals that the first statement is a subset of a second statement then an indication recording a directed edge between the two statements will be appropriately recorded (generally associated with the second statement) unless a third statement has been found for which the first statement is a subset and which is also a subset of the second statement. Systematic examination of each machine control statement in this manner results in the construction of an internal representation of the containment graph. Implementations of algorithms for building the containment graph will be readily apparent to persons skilled in the art.

Once the containment graph has been constructed, the consistency check-procedure moves onto a step 75 in which conflicts (basic problems) are identified. The process of step 75 involves examining each pairing of sibling statements in the constructed containment graph (two statements are siblings if they have a common parent in the containment graph). For each pairing of sibling statements A,B, if I is the intersection of the domain regions associated with the statements (that is, I is the overlap region) and D is the set of statements which are descendants of both statements in the pairing of sibling statements under consideration and U is the union of all the regions associated with the set D, then if (I-U) is not empty, then the resulting domain region represents an area of inconsistency and is added to a problem set P.

Applying the process of step 75 to the FIG. 12 example, each pairing of the statements, Resale, Internal, Stock and Demo (these statements all being siblings in terms of the containment graph of FIG. 12C) is considered in turn and any intersection of the corresponding domain regions for the statement pairing under consideration is derived as is the union of all regions in the set D of common descendants. In fact, in the FIG. 12 example, the set D is empty for all pairings and I is non-zero only for the pairing of the Internal and Stock statements (that is, the statements whose regions 92 and 93 overlap into FIG. 12B). For this latter pairing of statements, (I-U) is not empty but equal to I, this corresponding to the region of overlap of the regions 92 and 93 of FIG. 12B. This intersection I of the regions of the Internal and Stock statements is added to the problem set P and in fact is the sole member of that set.

Once the basic problems have been found in step 75 of the FIG. 11 consistency check procedure, the user is notified of the existence of one or more problems for example by the display of a "?" icon 100 as is shown in FIG. 12D with arms from the icon terminating at conflicting statements. At this point, the user can elect to return to the editing step 65 of the decision edit process of FIG. 10A in order to modify the set of machine control statements in any manner to bring about resolution of the identified conflict or conflicts. Alternatively, the user can ask the consistency check procedure to provide further help in identifying the problem and to suggest possible resolutions, this being done in steps 76, 77 and 78 of the FIG. 11 process. Steps 76 to 78 will be described more fully hereinafter; for now it is sufficient to note that they seek to resolve problem(s) by proposing new exception statements corresponding to the problem(s).

Thus for the FIG. 12 example, the application of steps 76 to 78 results in the proposal of a new machine control statement 101 as an exception statement coincident with the overlap area of the regions 92 and 93 of FIG. 12B, that is, the region corresponding to the condition factor Order Type having a value I1 and the condition factor ID-code having a value of 93. As shown in FIG. 12D, the derivation of the region of the new statement 101 from the conflicting Internal and Stock statements can be graphically depicted by arms 102. The proposed new statement 101 is in the form of an exception statement but its outcome (discount value) must be specified by the user before the statement is complete.

FIG. 13A illustrates the table 80 after the addition of the new rule (named Stock-93 in row 103 of the table). The region 104 corresponding to this new statement Stock-93 is illustrated in FIG. 13B and, as can be seen, this region 104 is coincident with the overlap between the regions 92 and 93 of the statements Internal and Stock.

When the consistency check procedure of FIG. 11 is repeated, the resultant containment graph is of the form illustrated in FIG. 13C in which a node 105 corresponding to the Stock-93 statement depends from the nodes 97 and 98 associated with the Internal and Stock statements. This time when the sibling pairing of the Internal and Stock statements are considered in step 75 of the consistency check procedure, the set D of statements which are descendants of the sibling pairing under consideration contains the Stock-93 statement and the union of all the regions in D will correspond to the region of the statement Stock-93. As a result, (I-U) will be empty as, of course, the region of the Stock-93 statement is identical to the intersection I of the regions of the Internal and Stock statements. The set of statements represented in table 80 are therefore passed as consistent.

Returning now to a consideration of steps 76 to 78 of the FIG. 11 consistency check procedure, as already noted the general effect of these steps is to propose new exception statements that correspond to the identified problem areas and will result in a consistent overall set of statements. The example given above with reference to FIGS. 12 and 13 concerns the simplest case in which there is only one initial problem that can be turned directly into a corresponding new exception statement consistent with the other statements. This simple situation is represented by Example A of FIG. 14.

In Example A, two initial machine control statements, A1, A2 overlap with each other (as shown in column I) and have an associated containment graph (formed in step 74 of FIG. 11) of the form shown in column II; the overlap region between statements A1 and A2 constitutes a problem PA(1, 2) that is identified in step 75 of FIG. 11) and is graphically represented in column III. This problem PA (1,2) can be directly proposed (step 78 of FIG. 11) as a new exception statement XPA(1,2) to result in a revised containment graph as shown in column V.

In many instances, however, the initially identified problems cannot be directly proposed as new exception statements as to do so would result in new conflicts and problems. Steps 76 and 77 of FIG. 11 serve to split up the initially identified problems so as to produce a set of problems that can be used directly as the basis for a corresponding set of proposed new exception statements.

Figure 14:
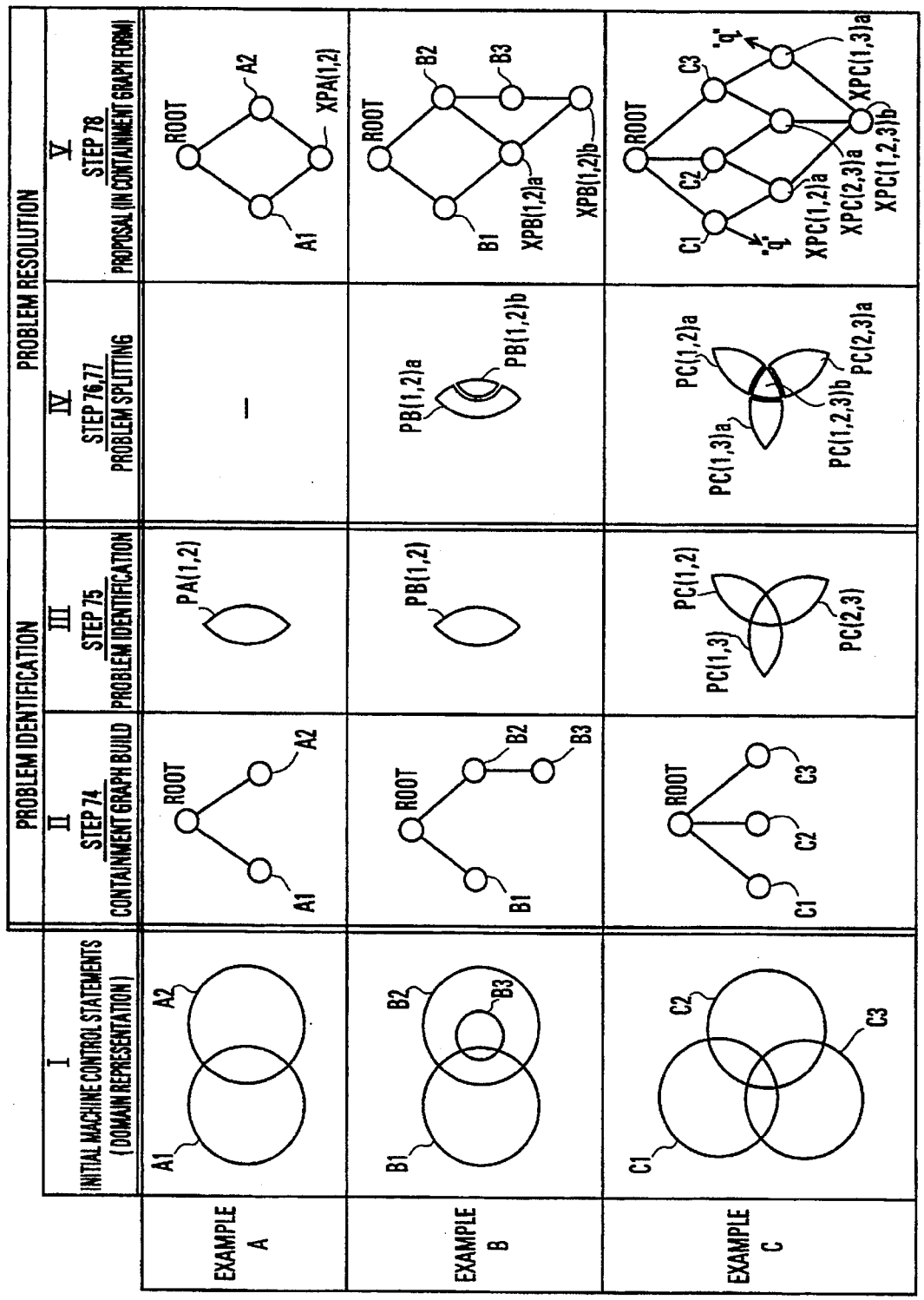
FIG. 14 is a Table illustrating a problem-splitting operation carried out as part of the FIG. 11 consistency check procedure.

Step 76 is concerned with situations of the type represented by Example B of FIG. 14 where direct proposal of an identified problem as an exception statement would result in conflict with an existing statement that would be its sibling in the containment graph. In Example B, there are three initial machine control statements B1, B2 and B3, the latter being an exception to B2 and therefore its child in the containment graph (see columns I and II). Step 75 of FIG. 11 will identify a single problem PB(1,2) resulting from the overlap of statements B1 and B2. If this problem PB(1,2) were to be directly proposed as a new exception statement a new conflict would arise, this time between the proposed new exception statement and its sibling constituted by the existing exception statement B3. To deal with this situation, step 76 of FIG. 11 first identifies such potential conflicts between each problem and potential siblings (that is, siblings in the containment graph if the problem was to be added as a statement to the graph), and then resolves the conflicts by appropriately splitting the problem according to the identified zones of conflict. For Example B, this resolution involves splitting problem PB(1,2) into two parts, problems PB(1,2)a and PB(1,2)b (see column IV); problem PB(1,2)b corresponds to the area of overlap between the original problem PB(1,2) and its potential sibling B3. Now if exception statements XPB(1,2)a and XPB(1,2)b are proposed corresponding to problems PB(1,2)a and PB(1,2)b, there are no new or unresolved conflicts as, of course, XPB(1,2)b forms a valid exception to statement B3. The corresponding containment graph is shown in column V.

Step 77 is concerned with situations of the type represented by Example C of FIG. 14 where direct proposal of identified problems as new exception statements would result in conflict between these proposed new statements. In Example C, there are three initial machine control statements C1, C2, C3 that all overlap with one another and are siblings in the containment graph (see columns I and II). Step 75 of FIG. 11 will identify three problems PC(1,2), PC(2,3) and PC(1,3) resulting from the overlap of statements C1 and C2, C2 and C3, and C1 and C3 respectively. Directly proposing these problems as new exception statements would result in a new conflict arising, this time between the proposed new statements themselves. To deal with this situation, step 77 of FIG. 11 places the originally identified problems into an unchecked-problem set and then takes each problem from this set in turn and checks for overlaps with the remaining problems in the set. If no overlaps are found in respect of a particular problem under consideration, the problem is moved to a checked-program set and is not replaced in the unchecked-problem set. However, if an overlap is identified with a problem remaining in the unchecked-problem set, then the problem under consideration is split into new problems according to the identified zones of overlap and these new problems are placed in the unchecked-problem set (unless an identical problem is already present). In due course, the unchecked-problem set will be empty and the checked problem set will contain non-overlapping problems which can be used as the basis for non-conflicting exception statements.

For Example C, step 77 will result in the three problems PC(1,2), PC(2,3) and PC(1,3) being split into four new problems PC(1,2)a, PC(2,3)a, PC(1,3)a and PC(1,2,3)b as shown in column IV; as can be seen, these new problems do not overlap with each other. Exception statements XPC(1,2)a, XPC(2,3)a, XPC(1,3)a and XPC(1,2,3)b can now be proposed corresponding to problems PC(1,2)a, PC(2,3)a, PC(1,3)a and PC(1,2,3)b; the corresponding containment graph is shown in column V.

Returning now to a consideration of FIG. 10A, upon the set of machine control statements under consideration passing the consistency check procedure, the decision edit process 19 will proceed (either automatically or upon user request) to create a decision function in the form of a flattened decision tree (step 68 of FIG. 10A). Such a tree may be formed by a systematic traversal of the corresponding containment graph with a test being set out at each node for the existence of the corresponding set of condition factor values for the statement represented by the node. The derivation of a flattened decision tree will be readily apparent to persons skilled in the art.

Figure 10B:
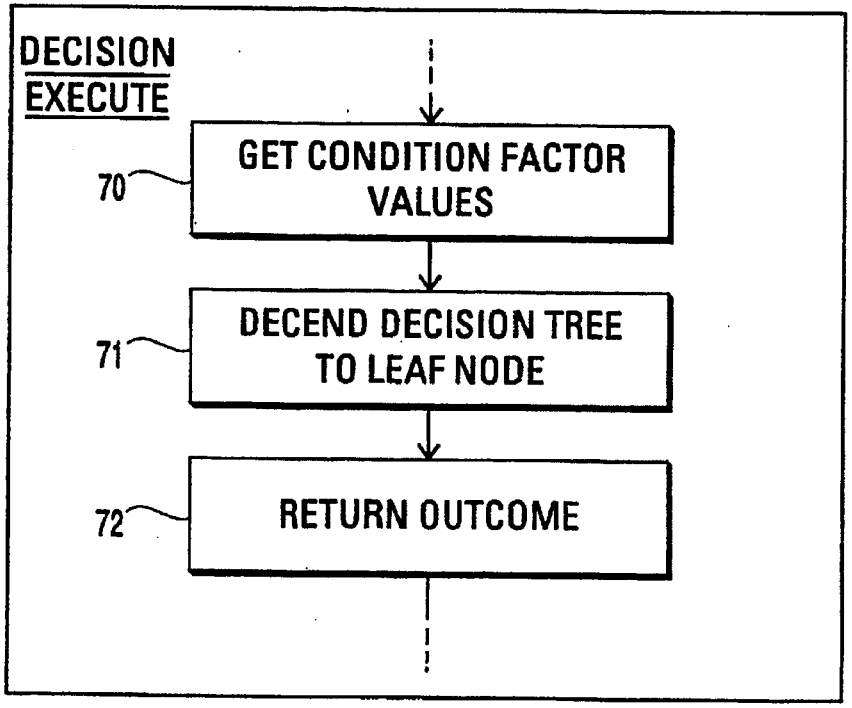
FIG. 10B is a flow chart illustrating decision execution steps of an application program.

During execution of the application program 12 upon the decision task 14 being executed, the flattened decision tree representing the decision function is called from the decision store 15. As is depicted in FIG. 10B, thereafter the values of all the condition factors relevant to the decision function are derived (step 70) in the appropriate manner (for example, by access to the database 13 of factual information, by user query, or by reference to accessible hardware such as monitoring equipment). Next, the flattened decision tree is descended (step 71) to a leaf node and the outcome at the node is noted. This outcome is then returned (step 72) as the appropriate outcome for the decision function.

By the very form of the containment graph and the resultant decision tree, exception statements automatically take precedence over conflicting more general statements. This is because exception statements depend from the statements for which there are exceptions (see, for example, the Stock-93 statement in the containment graph of FIG. 13C). Therefore when the flattened decision tree is formed an exception statement will take the form of a test to be carried out once a level has been reached corresponding to the statement for which it is an exception. As a result, when the decision function is executed, any exception statement to a more general statement will be tested and taken up if the test is passed. Other implementations may, however, require the consistency check procedure to note explicitly the existence of an exception statement and link this knowledge to the more general statements involved.

Many variants are, of course, possible to the above-described implementation of the invention. The generation of a set of machine control statements including exception statements can be effected with a user interface differing from that of the table formats of FIGS. 6 and 8. Furthermore, if the consistency check procedure of FIG. 11 identifies a conflict (problem) between two or more machine control statements, then the user may be given the option of designating one of the statements as having precedence over the statements with which it conflicts, even though the former statement is not an exception statement.

We claim:

1. A method of facilitating user generation of a set of machine control statements that taken together constitute a decision function relating particular value combinations of a predetermined set of condition factors to corresponding particular outcomes of a set of such outcomes, each individual machine control statement associating a set of one or more condition-factor value combinations, herein CFVCs, with a said outcome; said method comprising the steps of:

activating a computer system to display to a user a structured representation for said machine control statements in which one of said statements is represented in terms of a visual association between its CFVC set and corresponding outcome;

supplying the computer system with user inputs indicative of at least one new control statement and a modification of at least one existing machine control statement, the computer system responding to the user inputs to create at least one new machine control statement and/or modify at least one existing machine control statement thereby to generate a new said set of machine control statements, said new and/or modified statements being represented in said structured representation; and the computer system responding to the user inputs by carrying out a consistency check on said new set of machine control statements by:
(a) identifying any conflicts between statements by identifying any group of at least one CFVC which is common to a plurality of said statements that do not all specify the same outcome,
(b) determining whether any such conflict is resolvable on the basis of a more specific statement having precedence over a more general one, by determining whether the corresponding said group is equal to the set of all the CFVCs encompassed by a said statement of said plurality, the presence of any such latter statement, herein an exception statement, determining said conflict to be resolvable with said exception statement being associated with any other said statement of said plurality such that the exception statement has precedence over said any other statement, and
(c) accepting said new set of statements unless an unresolvable conflict is present.

2. A method according to claim 1, wherein said structured representation is a table arranged in rows and columns with the intersection of each row and column defining a cell, each said machine control statement being represented in the table by a said row/column and each said condition factor being associated with a respective column/row and said outcome with at least one column/row whereby the condition factor and outcome values associated with any particular said statement are specified in the corresponding cells of the said row/column representing that statement.

3. A method according to claim 1, wherein said structured representation is such that the computer system constrains the CFVC set of a said new/modified statement to being within a subset of the set of all possible CFVCs to limit the potential for conflict of said new/modified statement to existing statements with a CFVC set within said subset.

4. A method according to claim 1, wherein said predetermined set of condition factors comprises at least two primary condition factors and said structured representation comprises at least one table representing a respective subset of all possible CFVCs of said primary condition factors which subset is free of overlap with a said subset represented by any other said table, said at least one table having rows and columns that serve to associate values of a pairing of said primary condition factors with said rows representing respective particular values of a first said primary condition factor of said pairing and said columns representing respective particular values of a second said primary condition factor of said pairing, the intersection of each row and column defining a cell, and each said machine control statement which has its CFVC set encompassed by said subset of a said at least one table and which is not an exception statement, being represented in the corresponding table by a respective said cell with the values of said first and second primary condition factors for that statement corresponding to the combination of condition factor values associated with the defining row and column of the cell and the outcome of that statement being specified in the cell itself.

5. A method according to claim 4, wherein said structured representation comprises a plurality of said tables which are individually selected by the computer system for display, activating the computer system to display the individually selected tables.

6. A method according to claim 5, wherein said predetermined set of condition factors further comprises at least one secondary condition factor, the CFVC set of any said exception statement including both:

a combination of values of said primary condition factors in respect of which a said cell and corresponding non-exception statement exist, and at least one value of at least one said secondary condition factor, the exception statement specifying a different outcome to said corresponding non-exception statement whereby it constitutes an exception to the latter.

7. A method according to claim 6, wherein the presence of said exception statement is indicated in the said table in which the corresponding said non-exception statement is represented by a user-discernible indication associated with the table cell representing the non-exception statement, the computer system being activated to enable user accesses to said exception statement by user identification of the cell concerned.

8. A method according to claim 1, wherein said consistency check is carried out upon a user request following a user input for creating at least one new/modified statement.

9. A method according to claim 1, further comprising activating the computer system to provide a visual indication to the user of the presence of a said unresolvable conflict in response to the consistency check performed by the computer system determining that the said unresolvable conflict is present.

10. A method according to claim 1, further comprising activating the computer system so a user can resolve an otherwise unresolvable conflict by designating a selected one of said statements as having precedence over any other statement with which it conflicts.

11. A method according to claim 1, further comprising activating the computer system so that in response to said consistency check determining that a said unresolvable conflict is present, a proposal is presented to the user to enable a resolution of said conflict by using said conflict as the basis for one or more new exception statements.

12. A method according to claim 1, further comprising activating the computer system so the user can modify said structured representation to add additional condition factors by selection from a list of such factors.

13. A method according to claim 1, further including the step of activating the computer system so it converts said machine control statements into a unified flattened tree structure for representing said decision function.

14. Apparatus for facilitating user generation of a set of machine control statements that taken together constitute a decision function relating particular value combinations of a predetermined set of condition factors to corresponding particular outcomes of a set of such outcomes, each individual machine control statement associating a set of one or more condition-factor value combinations, herein CFVCs, with a said outcome; said apparatus comprising:

a memory storing said machine control statements;

display means for displaying to a user a structured representation of said existing machine control statements in which a said statement is represented in terms of a visual association between its CFVC set and corresponding outcome; input means for receiving user input for creating a new machine control statement and/or for modifying at least one existing machine control statement thereby to generate a new said set of machine control statements, said new and/or modified statements being represented in said structured representation; and conflict-checking means for carrying out a consistency check on said new set of machine control statements by:

(a) identifying any conflicts between statements by identifying any group of at least one CFVC which is common to a plurality of said statements that do not all specify the same outcome, (b) determining whether any such conflict is resolvable on the basis of a more specific statement having precedence over a more general one, by determining whether the corresponding said group is equal to the set of all the CFVCs encompassed by a said statement of said plurality, the presence of any such latter statement, herein an exception statement, determining said conflict to be resolvable with said exception statement being associated with any other said statement of said plurality such that the exception statement has precedence over said any other statement, and (c) inhibiting acceptance of said new set of statements where an unresolvable conflict is present.

15. A computer memory for use with a computer system for executing a method of facilitating user generation of a set of machine control statements that taken together constitute a decision function relating particular value combinations of a predetermined set of condition factors to corresponding particular outcomes of a set of such outcomes, each individual machine control statement associating a set of one or more condition-factor value combinations, herein CFVCs, with a said outcome; said memory storing signals to cause the computer system to be activated to:

display to a user station a structured representation for said machine control statements in which one of said statements is represented in terms of a visual association between its CFVC set and corresponding outcome;

respond to user inputs indicative of at least one new control statement and a modification of at least one existing machine control statement to create at least one new machine control statement and/or modify at least one existing machine control statement thereby to generate a new said set of machine control statements, said new and/or modified statements being represented in said structured representation; and respond to the user inputs to carry out a consistency check on said new set of machine control statements by:

(a) identifying any conflicts between statements by identifying any group of at least one CFVC which is common to a plurality of said statements that do not all specify the same outcome, (b) determining whether any such conflict is resolvable on the basis of a more specific statement having precedence over a more general one, by determining whether the corresponding said group is equal to the set of all the CFVCs encompassed by a said statement of said plurality, the presence of any such latter statement, herein an exception statement, determining said conflict to be resolvable with said exception statement being associated with any other said statement of said plurality such that the exception statement has precedence over said any other statement, and (c) accept said new set of statements unless an unresolvable conflict is present.

* * * * *